(12) United States Patent
Hölting

(10) Patent No.: US 7,431,058 B2
(45) Date of Patent: Oct. 7, 2008

(54) DEVICE FOR CHANGING NOZZLES

(75) Inventor: Ludwig Hölting, Bruchköbel (DE)

(73) Assignee: Lurgi Zimmer GmbH, Frankfurt Am Main (DE)

( * ) Notice: Subject to any disclaimer, the term of this patent is extended or adjusted under 35 U.S.C. 154(b) by 705 days.

(21) Appl. No.: 10/509,610

(22) PCT Filed: Mar. 15, 2003

(86) PCT No.: PCT/EP03/02721

§ 371 (c)(1),
(2), (4) Date: Sep. 27, 2004

(87) PCT Pub. No.: WO03/086620

PCT Pub. Date: Oct. 23, 2003

(65) Prior Publication Data

US 2005/0173471 A1    Aug. 11, 2005

(30) Foreign Application Priority Data

Apr. 18, 2002  (DE) ................. 102 17 182

(51) Int. Cl.
*B65B 1/04* (2006.01)
(52) U.S. Cl. .................. 141/374; 141/353; 141/355; 141/356; 141/296

(58) Field of Classification Search .................. 141/374, 141/353, 355, 356, 296; 222/566
See application file for complete search history.

(56) References Cited

U.S. PATENT DOCUMENTS

| 2,768,067 | A | * | 10/1956 | Heller | 423/456 |
| 2,809,098 | A | * | 10/1957 | Larson | 423/456 |
| 2,870,944 | A | * | 1/1959 | Campbell | 222/509 |
| 3,087,796 | A | * | 4/1963 | Latham, Jr. et al. | 422/150 |
| 3,497,324 | A | * | 2/1970 | Loewen | 422/49 |
| 4,268,107 | A | | 5/1981 | Moerre | |
| 4,585,644 | A | | 4/1986 | Divis | |
| 7,059,369 | B2 | * | 6/2006 | Krywitsky | 141/362 |
| 7,293,418 | B2 | * | 11/2007 | Noble et al. | 62/50.6 |

FOREIGN PATENT DOCUMENTS

| CH | 425 733 | 1/1963 |
| EP | 0 244 546 | 11/1987 |
| FR | 1 055 996 | 9/1951 |

* cited by examiner

*Primary Examiner*—Khoa D Huynh
(74) *Attorney, Agent, or Firm*—Andrew Wilford

(57) ABSTRACT

The invention relates to a device which enables nozzles to be changed without changing the pressure conditions in the container or device associated therewith. According to the invention a connector piece support (2) is fixed to a pressurised container (1) wherein a medium (20) is guided into said container through a nozzle (8) by means of a lance (7). Said connector piece is connected to a sealing housing (5) by means of a locking device (3) in order to receive the lance (7). Sealing rings (13*a*, 13*b*, 13*c*) are arranged in the sealing housing (5) thereby ensuring pressure-tightness in relation to the container (1) and the surrounding area when the lance (7) is inserted into the sealing housing (5).

7 Claims, 2 Drawing Sheets

DEVICE FOR CHANGING NOZZLES

DEVICE FOR CHANGING NOZZLES

The invention relates to a device for changing nozzles. In numerous production processes spray nozzles are used for various purposes. This function can be condensation, cooling, cleaning, and vaporizing. According to function, various nozzle types are employed such as fan, hollow cone, or full cone.

As a rule the nozzles are set in the wall of a vessel or a process apparatus. Such mounting facilitates collecting and recirculating the process water and also ensures fixed positions for the sprays. Many processes must take place under pressures above or below atmospheric. Thus some medium must be sprayed into pressurized or vacuum vessels or conduits. In addition the vessel or conduit can be single- or double-walled and heated or cooled. For continuous operation as a rule several nozzles are provided. These nozzles need to be cleaned and changed periodically. When one nozzle is being changed at least one other must be left operational, to avoid changing the nonatmospheric pressure inside the vessel.

Such an applications of this invention is seen in a method of making polyethylene enterephthalate (PET). An apparatus using nozzles for condensing a process liquor and vacuum production by means of multistage steam injection with upstream spray condensers and downstream mixing condensers are described in EP 0,244,546. Here glycol is sprayed via nozzles into a subatmospheric-pressure stage.

Systems are known where the nozzles are fixed on a lance, inserted through a support tube, and secured in place. Other systems have lances that are inserted through a ball valve flanged to the support tube. In these systems it is however necessary to stop the process or put up with substantial leakage when servicing nozzles.

It is an object of the invention, starting from this state of the art, to provide a device for changing nozzles without having to change the pressure characteristics inside the process vessel or apparatus.

According to the invention this object is achieved in the above-described apparatus in that a support tube is mounted on the vessel and is connected via a valve with a seal housing for the lance and that seal rings are provided in the seal housing to ensure pressure-tight sealing between the vessel and its surroundings when the lance is inserted into the seal housing. This device can be used on a pressurized or vacuum conduit instead of on a pressurized or vacuum vessel. In addition this device works equally well for cooled or heated conduits or vessels as well as for single- or multiple-wall conduits or vessels.

Sealing is improved by feeding a blocking liquid into the seal housing. Instead of a liquid it also possible tp urge with gas and achieve additional sealing.

To ensure near perfect sealing, the blocking fluid is injected between two seals and between the seal assembly and the seal.

The conduits for feeding the blocking fluid in between the seal assembly can also serve for venting. When horizontal, the entire device ensures a complete venting of the system. When mounted vertically or at an angle a nearly complete venting of the system is possible.

A valve underneath the seal housing serves for draining the seal housing.

In order to ensure centering of the lance through the seal assembly and to prevent damage to the seals, the lance is centered by at least one guide in the seal housing. In this manner the nozzle is not damaged when the lance engages the flat or tapered seat surface.

Embodiment of the device are described with reference to the drawing. Therein:

Figure 1:
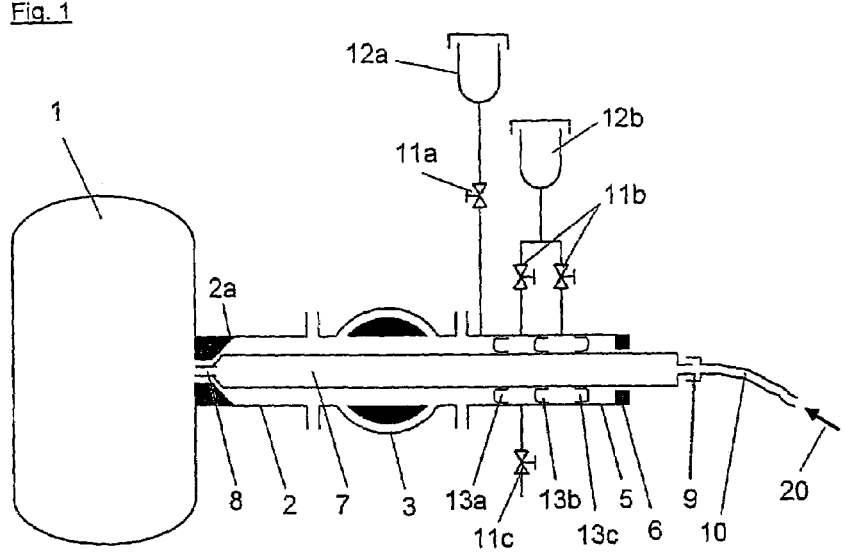
FIG. 1 shows the arrangement of a nozzle lance in use.

FIG. (1) shows a system with a vessel (1) that is above or below atmospheric pressure and that can be heated or cooled. This vessel (1) carries a support tube (2) that can be oriented horizontally, vertically, or at an angle. The tube has a flat or conically tapered seat surface (2a) against which a nozzle lance (7) can fit. A flange connects the support tube (2) with at least one pressure- or vacuum-tight ball valve (3) and a seal housing (5) so as to be pressure- and vacuum-tight. Other valves with straight-through passages such as for example slider valves can be used instead of the ball valve. A nozzle lance (7) is fitted to this arrangement, seated in the support tube (2). A tip of the lance (7) has a spray nozzle (8). The medium (20) to be sprayed in is supplied to the end of the lance (7) by a hose (10). The hose (10) is connected by a snap coupling (9) with the lance (7). The lance (7) is centered by a guide (6) in the tube (2). The seal housing (5) is directly sealed and flanged with the ball valve (3) and has at least two seal rings (13a) and (13b) that serve to maintain pressure in the vessel (1). A seal ring (13c) prevents leakage into or from the exterior. The seal housing (5) is pressurized with a blocking fluid between the seal rings (13a, 13b, and 13c). This blocking liquid is normally the same as that being sprayed in. The seals (13a, 13b, and 13c) can be corrugated or rod seal rings. The blocking liquid is supplied to the seal housing via valves (11b) from supplies (12a and 12b). The seal housing is drained by a lower valve (11c). The seal housing is vented during insertion of the lance via the valves (11a) and (11b) and the supplies (12a and 12b) while feeding in the blocking liquid. In use the lance (7) with ita nozzle (8) is fitted to the seat (2a) of the tube (2). In use the medium (20) to be sprayed in is supplied through the hose (10). The valves (11a and 11c) are closed. The ball valve (3) and the valve (11b) are open. The supplies (12a and 12b) are filled with blocking fluid.

Figure 2:
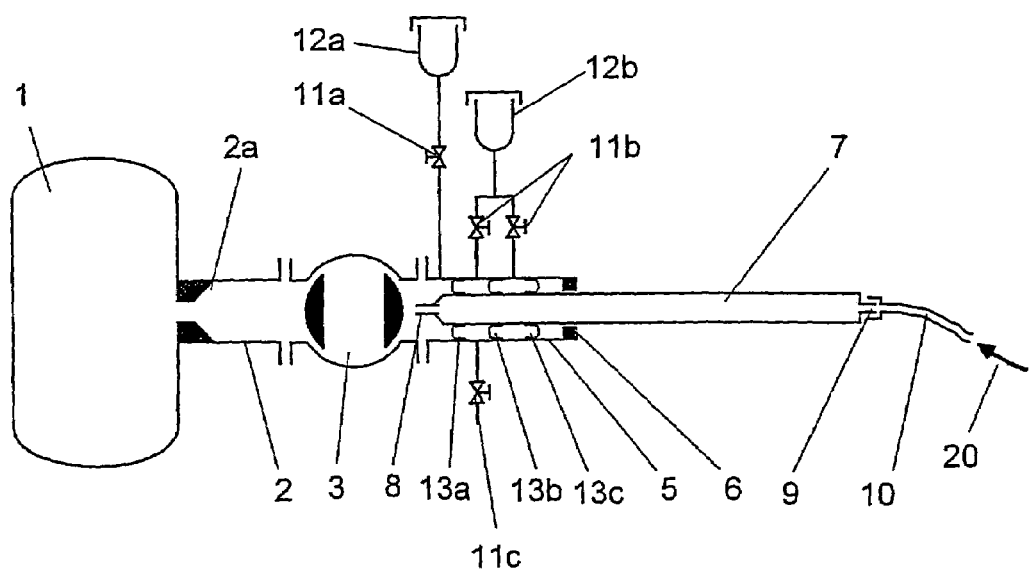
FIG. 2 shows the intermediate position of the nozzle during installation and removal.
Figure 3:
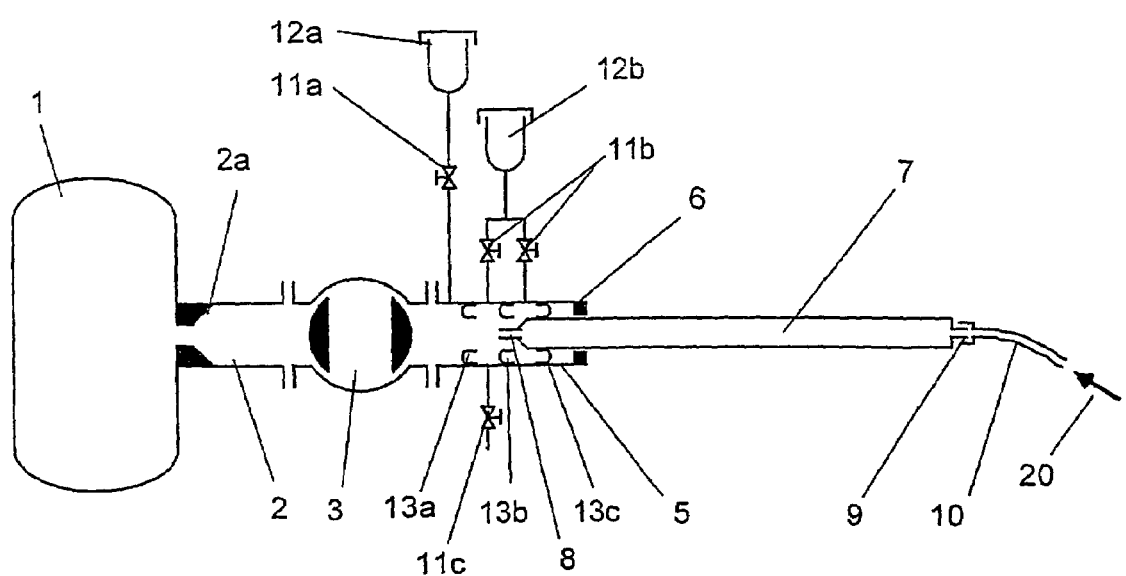
FIG. 3 shows the outer position of the nozzle during installation and removal.

To take out the lance (7), feed of the spraying medium (20) is first stopped. The lance (7) is moved into an intermediate position outward of the ball valve and adjusted (see FIG. 2). Then the valve (3) is closed. In order to equalize pressure the valve (11a) is opened. The valve (11b) is closed. The lance (7) is then moved into an outer position (see FIG. 3) so that the lance tip with the nozzle (8) is inward of the seal (13c). Then the seal housing (5) is emptied via the valve (11c). The lance (7) can then is be pulled completely out.

To insert the lance (7), it is moved into the outer position (see FIG. 3) so that the lance tip with the nozzle (8) is inward of the seal (13c). The ball valve (3) and the drain valve (11c) are closed. A small amount of the blocking fluid is fed through the lance (7) into the seal housing. Meanwhile the valves (11a and 11b) are open. When the liquid levels in the supplies (12a and 12b) reach predetermined levels, the supply of the blocking fluid is ended. The seal housing (5) is thus vented of air. The lance (7) is now pushed into the intermediate position just outward of the ball valve (3) (see FIG. 2). The valve (11a) is closed and the valves (11b) remain open. Then the ball valve (3) is opened. The lance (7) is pushed inward against the flat or conical seat (2a). If the support tube (2) gets dirty, it can be rinsed out during insertion of the lance (7) with the spraying liquid.

The invention claimed is:

1. In combination with a vessel at nonatmospheric pressure and with an elongated tubular lance for feeding a fluid into or out of the vessel and having an end provided with a nozzle, a nozzle-changing system comprising:
- a support tube fixed to and opening into the vessel at a nozzle seat, the lance being fittable in the tube in an inner position with the nozzle fitted to the seat;
- a main valve provided on the tube outward of the seat and displaceable between a closed position completely blocking flow through the tube and an open position permitting such flow, the lance in its inner position extending through the valve in the open position thereof;
- a plurality of seal rings spaced along the tube outward of the valve and fittable with the lance when same is in the tube to form respective annular compartments in the tube around the lance; and
- means including purge valves opening into the compartments for admitting fluids into and draining fluids from the compartments.

2. The nozzle-changing system defined in claim 1 wherein the seal rings include an outer seal ring, an intermediate seal ring between the outer ring and the main valve and forming with the outer seal ring an outer compartment, and an inner seal ring between the intermediate ring and the main valve and forming with the intermediate seal ring an intermediate compartment and with the main valve an inner compartment, the purge valves including respective outer, intermediate, and inner valves opening into the compartments.

3. The nozzle-changing system defined in claim 2, further comprising
- means including a drain valve connected underneath the intermediate compartment for draining fluid therefrom.

4. The nozzle-changing system defined in claim 2, further comprising
- supplies of the blocking fluid connected to the outer and intermediate purge valves.

5. The nozzle-changing system defined in claim 1, further comprising
- a guide in the tube aligned with the seat and engageable with the lance for coaxial alignment of the lance in the tube and nozzle in the seat.

6. The nozzle-changing system defined in claim 1 wherein the seat is flat.

7. The nozzle-changing system defined in claim 1 wherein the seat is tapered and centered on an axis of the tube.

* * * * *